Sept. 16, 1969     D. J. WILSON     3,467,849

MULTIPLE OUTPUT VOLTAGE MULTIPLIER

Filed Aug. 3, 1967

INVENTOR.
Donald J Wilson
BY Ralph Hammar
Attorney

United States Patent Office 3,467,849
Patented Sept. 16, 1969

3,467,849
MULTIPLE OUTPUT VOLTAGE MULTIPLIER
Donald J. Wilson, Erie, Pa., assignor to Erie Technological Products, Inc., Erie, Pa., a corporation of Pennsylvania
Filed Aug. 3, 1967, Ser. No. 658,248
Int. Cl. H02m 7/06
U.S. Cl. 321—15    1 Claim

ABSTRACT OF THE DISCLOSURE

Regulation of dual output voltage multipliers is obtained by a feed back loop. In one form, the loop references the higher D.C. voltage output to the lower D.C. voltage output. The higher voltage output is adjustable.

This invention is a multiple output voltage multiplier which in a preferred form has low and high D.C. voltage outputs. The high voltage output is referenced to the low voltage output and a feed back loop provides inherent regulation. In one form, the high voltage output is adjustable without significantly varying the low voltage output.

Figure 2:
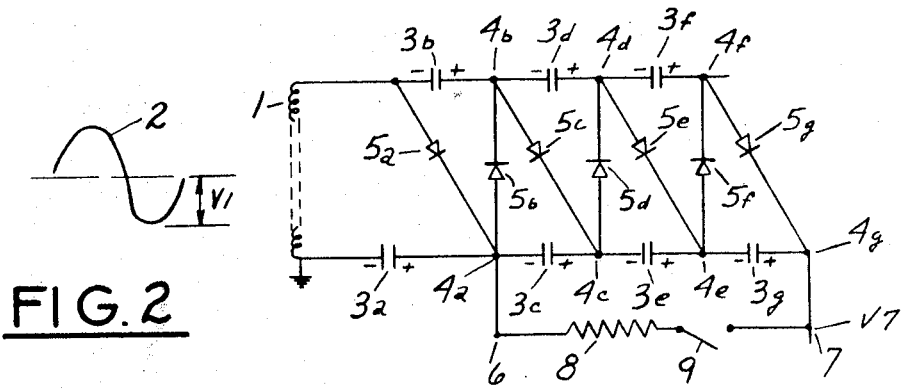
Figure 1:
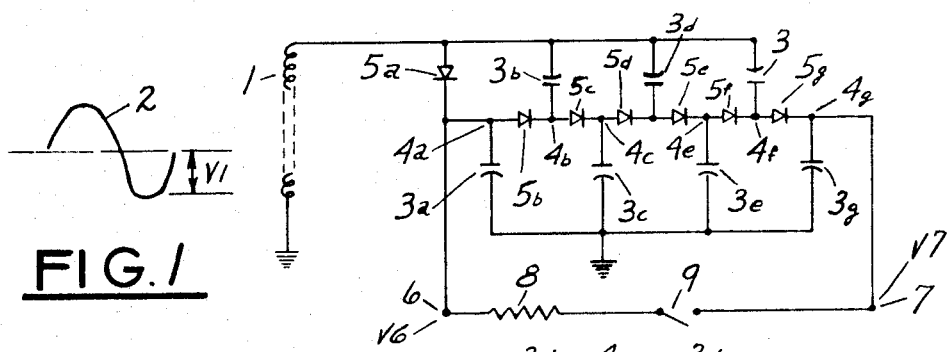
Figure 3:
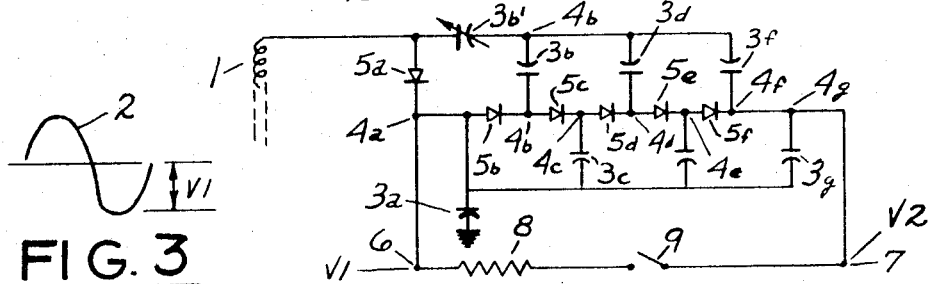
Figure 4:
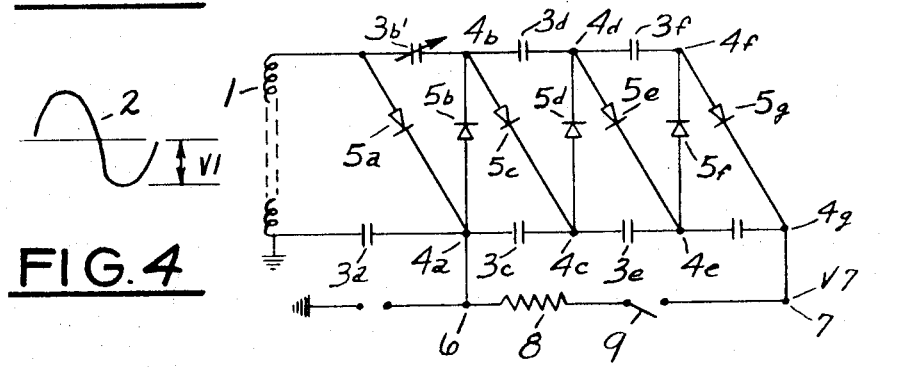

In the drawing, FIG. 1 is a circuit diagram of a dual output parallel connected voltage multiplier, FIG. 2 is a circuit diagram of a dual output series connected voltage multiplier, FIG. 3 is a modification of FIG. 1 in which the high voltage output is adjustable, and FIG. 4 is a modification of FIG. 2 in which the high voltage D.C. output is adjustable.

In the voltage multiplier of FIG. 1, the input is obtained from the secondary 1 of a transformer having an A.C. voltage indicated at 2 in which the peak of each half cycle is equal to $V_i$. The voltage multipler comprises a plurality of stages or sections each consisting of a rectifier and an associated capacitor. The first stage comprises a capacitor $3a$ arranged to be charged to a positive voltage at its terminal $4a$ through a rectifier $5a$ during each positive half cycle. The voltage at terminal $4a$ will accordingly be the peak voltage $V_i$ of the input and will be positive with respect to ground. The second stage of the voltage multiplier comprises a condenser $3b$ having its terminal $4b$ charged positive through rectifier $5b$ during each negative half cycle of the input voltage. Since the rectifier $5b$ is connected between the terminals $4a$ and $4b$, the D.C. voltage across condenser $3b$ is equal to the voltage of condenser $3a$ plus the peak voltage $V_i$ from the transformer 1. The third stage of the voltage multiplier comprises condenser $3c$ having a terminal $4c$ charged through rectifier $5c$ during each positive half of the cycle to a voltage equal to $V_i$ plus the voltage of condenser $3b$. The fourth, fifth, sixth and seventh stages of the voltage multiplier are indicated by the same reference numerals with the subscripts $d$, $e$, $f$ and $g$. The condensers $3a$, $3c$, $3e$ and $3g$ are charged positively with respect to ground during each positive half cycle of the input voltage while the condensers $3b$, $3d$ and $3f$ are charged negatively with respect to ground during each negative half cycle of the input voltage. In each case, the voltage of a condenser equals $V_i$ plus the voltage of the preceding condenser so that condenser $3a$ (the first stage) is charged to voltage $V_i$ plus O, condenser $3b$ (the second stage) is charged to voltage $V_i$ plus $V_i$, condenser $3c$ (the third stage) is charged to voltage $2V_i$ plus $V_i$ etc. until condenser $3g$ in the seventh stage of the multiplier is charged to seven times the voltage $V_i$ of the condenser $3a$ in the first stage. The voltage multiplier so far described is known as a parallel multiplier because the condensers each have a common electrode and thus appear to be connected in parallel. Condensers $3a$, $3c$, $3e$ and $3g$ have the common electrode connected to ground and the condensers $3b$, $3d$, and $3f$ have the common electrode connected to the high side. While the multiplier is called a parallel multiplier, the connections are such that the voltages in the successive stages are accumulated so that the voltage of stage $3_n$ is equal to $n$ times the voltage of a single stage.

The voltage multiplier of FIG. 1 provides two D.C. voltage outputs, a high voltage output appearing at terminal 7 or at the last stage of the multiplier, and the low voltage output appearing at terminal 6, one of the terminals of an earlier stage. In the particular multiplier shown, the low voltage output is obtained at the first stage terminal $4a$ but obviously could be obtained from a later stage such as $4b$ etc. The low voltage output appears between terminal 6 and ground. The high voltage output appears between terminal 6 and terminal 7 and the load connected to the high voltage output is indicated by the resistance 8 and switch 9. Under load conditions, the switch 9 is closed and the voltage $V_6$ at terminal 6 tends to rise toward the voltage $V_7$ at terminal 6 at a rate equal to $$(V_7 - V_6)\left(1 - e^{\frac{-t}{r_a}}\right)$$

where $t$ is time, $r$ is the load resistance 8, and $c$ is the capacitance of condensers $3a$ and $3g$ in series. This charge takes place during the first positive half cycle following the closing of switch 9. This means that during the first half cycle after closing the switch 9, the condenser $3a$ is charged to voltage $V_i$ plus $\Delta V$, or in other words, the normal charge $V_i$ of condenser $3a$ is increased because of the presence of the load resistance 8. On successive half cycles this incremental voltage $\Delta V$ is added to the charges of condensers $3b$, $3c$, $3d$, $3e$, $3f$ and $3g$. The voltage at terminal 7 will therefore rise by an amount equal to $\Delta V$ and the incremental voltage $\Delta V$ will appear across the low resistance 8. This will tend to maintain the voltages at terminals 6 and 7 at their no load values. The result is a self regulating control loop which tends to hold the voltages at terminals 6 and 7 constant under changing load conditions.

In FIG. 2, there is shown a multiplier which is identical with FIG. 1 except for the manner of connection of the multiplier stages. The individual multiplier stages $3a$–$g$, $4a$–$g$, and $5a$–$g$ are identical. The multiplier stages are, however, series connected in the sense that the condensers $3a$, $3c$, $3e$, $3g$ appear to be connected in series at the ground side of the multiplier and the condensers $3b$, $3d$, $3f$ appear to be connected in series at the high side of the multiplier. The mode of voltage multiplication is the same as in FIG. 1. The condenser $3a$ is charged to voltage $V_i$ during the first positive half cycle and during the next negative cycle, the voltage $V_i$ of condenser $3a$ is added to the negative charge $V_i$ on condenser $3b$. This is continued during successive half cycles so that the voltage across any condenser $3_n$ in the $n$th stage is equal to $n$ times the voltage $V_i$. In order to simplify the comparison between FIGS. 1 and 2, the low voltage D.C. output terminal 6 is shown connected to the terminal $4a$ of the first stage of the multiplier and the high voltage D.C. output terminal 7 is connected to the terminal $4g$ of the last stage of the rectifier and the load 8 is connected through switch 9 across the terminals 6 and 7. Under no load, the voltage $V_i$ at terminal 6 is equal to $V_i$ and the voltage $V_7$ at terminal 7 is equal to seven times $V_i$ since there are seven stages in the multiplier. When the switch 9 is closed, during the first half cycle the condenser $3a$ is charged at the rate equal to $$(V_7 - V_6)\left(1 - e^{\frac{-t}{RC}}\right)$$

or at the same rate as the condenser 3a is charged in the FIG. 1 circuit. This increases the voltage on condenser 3a by the amount ΔV and during successive half cycles, this voltage ΔV is added to the charge of condensers 3b, 3c, 3d, 3e, 3f and 3g so that ultimately the voltage ΔV appears across the load resistance 8 and compensates for the tendency of the voltage $V_7$ to drop under load and also for the tendency of the voltage $V_6$ at terminal 6 to rise toward the voltage $V_7$ at terminal 7. This maintains the voltages at terminals 6 and 7 substantially constant under changing load.

The circuit of FIG. 3 uses the same individual voltage multiplier sections of FIGS. 1 and 2 which are parallel connected as shown in FIG. 1 with the following modifications: First, a variable condenser 3b' is connected between the A.C. input and a portion of the multiplier stages. The purpose of the variable condenser is to cooperate with the input capacitance of these stages to provide a voltage divider to vary the A.C. input. As in voltage dividers, the A.C. voltage across condenser 3b' and the input capacitance in series is equal to the A.C. voltage across the input capacitance in FIG. 1 and accordingly in FIG. 3 a lesser A.C. voltage appears across the multiplier input which is variable in accordance with the adjustment of capacitor 3b'. A second difference in the circuit connections is that the common electrodes of capacitors 3c, 3e and 3g are connected to the terminal 4a of the first multiplier section which comprises the low voltage multiplier unit. This means that the multiplier sections beyond terminal 4a comprise a variable voltage multiplier unit whose A.C. input is a fraction of the A.C. input to the low voltage unit 3a, 4a, 5a. The condenser 3b' will ordinarily vary from substantially the size to several times the size of the input capacitance. For example, in a specific multiplier having an A.C. input of 400 volts at 15 kc. the input capacitance was 7 pf. and the condenser 3b' was variable from 7 pf. to 45 pf. This permits substantially a 2:1 variation of the output of the variable voltage multiplier. Under load, any change in $V_6$ due to charging of condenser 3a from $V_7$ is immediately transferred (during the next half cycle) to the variable voltage multiplier and the change or increment is pumped around the loop during succeeding half cycles to minimize variations in the voltage $V_6$ at terminal 6. In the specific example, variation in voltage $V_6$ was less than 10 volts from its normal voltage of 400 volts.

The circuit of FIG. 4 uses the same A.C. input and the same multiplier sections 3a–g, 4a–g, 5a–g series connected as in FIG. 2 with variable condenser 3b' substituted for condenser 3b to reduce the input voltage to the succeeding stages of the multiplier. The mode of operation is the same as FIG. 3. Incremental changes in voltage $V_6$ due to load 8 are applied to the stage 3b', 4b, 5b and are pumped around the loop including the succeeding stages 3c–g, 4c–g, 5c–g, switch 9 and resistance 8 preventing fluctuation of voltage $V_6$ due to change in load. As in FIG. 3, the sections 3b–g, 4b–g, 5b–g comprise an independent voltage multiplier having its D.C. output adjustable by varying capacitor 3b'.

The voltage regulation depends upon the pumping or feed back action by which during successive half cycles any increment in the low voltage output is pumped or transferred around the feed back loop. When the A.C. power input is disconnected, the feed back ceases and the condensers discharge causing the voltage $V_6$ to rise toward the voltage $V_7$. The increase of voltage $V_6$ may be prevented by an overvoltage protective means such as a spark gap, an avalanche diode, an SCR, etc. connected across $V_6$. Such means provide a low impedance short around $V_6$ whenever the voltage exceeds the permissive value.

What is claimed as new is:

1. A voltage multiplier having an A.C. input comprising a series of a plurality of condenser rectifier sections, alternate sections of the series being connected to the input to charge the condensers during positive half cycles and intermediate sections of the series being connected to charge the condensers during negative half cycles, and the sections of the series being connected to add the charges of the condensers in a cumulative manner to provid a D.C. output or outputs equal to the sum of the charges on the condensers, a low voltage D.C. output tap from a first condenser near the input, a high voltage output tap from a second condenser remote from the input, the sections between the input and the low voltage tap comprising a first multiplier unit and the sections between the high voltage tap and the low voltage tap comprising a second multiplier unit, the sections of the second multiplier unit being parallel connected in the sense that the condensers of said alternate sections of the series have common electrodes connected to one side of the A.C. input and the condensers of said intermediate sections of the series have common electrodes connected to the opposite side of the A.C. input, a feed back loop means from the high voltage output to the low voltage output for charging the first condenser of the second multiplier unit in proportion to the load drawn from the high voltage output, and a variable condenser connected in series with the condensers of the second multiplier unit to provide a voltage divider for adjustably reducing the charge available to the second multiplier unit and thereby to reduce the high voltage output without affecting the low voltage output.

References Cited

UNITED STATES PATENTS

| | | | |
|---|---|---|---|
| 3,175,104 | 3/1965 | Curtis | 307—110 X |
| 2,213,199 | 9/1940 | Bouwers et al. | 321—15 |
| 2,682,002 | 6/1954 | Gibson | 321—15 X |

JOHN F. COUCH, Primary Examiner

W. H. BEHA, JR., Assistant Examiner

U.S. Cl. X.R.

307—110